(12) United States Patent
Lin

(10) Patent No.: US 12,279,230 B2
(45) Date of Patent: Apr. 15, 2025

(54) PEIPS APPLICABILITY CONSIDERING NON-3GPP REGISTRATION

(71) Applicant: MEDIATEK INC., Hsin-Chu (TW)

(72) Inventor: Yuan-Chieh Lin, Hsin-Chu (TW)

(73) Assignee: MediaTek Inc., Hsinchu (TW)

( * ) Notice: Subject to any disclaimer, the term of this patent is extended or adjusted under 35 U.S.C. 154(b) by 345 days.

(21) Appl. No.: 18/080,105

(22) Filed: Dec. 13, 2022

(65) Prior Publication Data

US 2023/0232369 A1 Jul. 20, 2023

Related U.S. Application Data

(60) Provisional application No. 63/299,447, filed on Jan. 14, 2022.

(51) Int. Cl.
*H04W 68/02* (2009.01)
*H04W 60/00* (2009.01)

(52) U.S. Cl.
CPC ......... *H04W 68/02* (2013.01); *H04W 60/005* (2013.01)

(58) Field of Classification Search
CPC .............................. H04W 68/02; H04W 60/005
USPC ................ 455/435.1, 458, 432.1, 422.1, 418
See application file for complete search history.

(56) References Cited

U.S. PATENT DOCUMENTS

| | | | | |
|---|---|---|---|---|
| 2023/0232325 A1* | 7/2023 | Ye | ..................... | H04W 52/0245 455/574 |
| 2023/0362704 A1* | 11/2023 | Edge | .................. | H04B 7/18513 |
| 2024/0365282 A1* | 10/2024 | Wu | ..................... | H04W 68/005 |

OTHER PUBLICATIONS

Taiwan Intellectual Property Office Action 112101504., dated Jan. 5, 2024 (9 pages).
Apple NAS Signaling for Idle/Inactive UE Paging Subgrouping for enhanced UE Power Saving 3GPP TSG SA WG2 Meeting 147-e Oct. 18-22, 2021 https://www.3gpp.org/ftp/tsg_sa/WG2_Arch/TSGS2_147E_Electronic_2021-10/Docs/S2-2107778.zip.
"New Requirements of PEIPS" 3GPP TSG-CT WG1 Meeting #133e-bis Jan. 17-21, 2022 (Retrieved date on Jan. 10, 2022) https://www.3gpp.org/ftp/tsg_ct/WG1_mm-cc-sm_ex-CN1/TSGC1_133ebis/Docs/C1-220162.zip.
Europe IPO, search report for the European patent application 23150055.4, dated May 24, 2023 (9 pages).
Apple: "NAS Signaling for Idle/Inactive UE Paging Subgrouping for enhanced UE Power Saving", 3GPP draft, S2-2107778, (Oct. 25, 2021), XP052062651.
Mediatek Inc: "New Requirements of PEIPS", 3GPP draft, C1-220162, (Jan. 10, 2022), XP052090428.

* cited by examiner

*Primary Examiner* — Nghi H Ly
(74) *Attorney, Agent, or Firm* — Helen Mao; Zheng Jin; Imperium Patent Works

(57) ABSTRACT

A method of handling Paging Early Indication with Paging Subgrouping (PEIPS) assistance information when a UE is registered to the same or different PLMN/SNPN networks is proposed. The PEIPS assistance information includes PEIPS parameters such as a PEIPS subgroup ID that is used by the UE for monitoring paging with PEIPS for power saving. If the UE registers to the same PLMN/SNPN via 3GPP access and non-3GPP access, then the UE handles the PEIPS parameters as one common parameters. If the UE registers to different PLMN/SNPN via 3GPP access and non-3GPP access, then the UE handles the PEIPS parameters as two independent parameters.

18 Claims, 4 Drawing Sheets

PEIPS APPLICABILITY CONSIDERING NON-3GPP REGISTRATION

CROSS REFERENCE TO RELATED APPLICATIONS

This application claims priority under 35 U.S.C. § 119 from U.S. Provisional Application No. 63/299,447, entitled "PEIPS applicability considering non-3GPP registration", filed on Jan. 14, 2022, the subject matter of which is incorporated herein by reference.

TECHNICAL FIELD

The disclosed embodiments relate generally to wireless communication, and, more particularly, to Paging Early Indication with Paging Subgrouping (PEIPS) assistance information handling when UE is registered to one or two networks via both 3GPP access and non-3GPP access.

BACKGROUND

Third generation partnership project (3GPP) and 5G New Radio (NR) mobile telecommunication systems provide high data rate, lower latency and improved system performances. In 3GPP NR, 5G terrestrial New Radio (NR) access network (includes a plurality of base stations, e.g., Next Generation Node-Bs (gNBs), communicating with a plurality of mobile stations referred as user equipment (UEs). Orthogonal Frequency Division Multiple Access (OFDMA) has been selected for NR downlink (DL) radio access scheme due to its robustness to multipath fading, higher spectral efficiency, and bandwidth scalability. Multiple access in the downlink is achieved by assigning different sub-bands (i.e., groups of subcarriers, denoted as resource blocks (RBs)) of the system bandwidth to individual users based on their existing channel condition. In LTE and NR networks, Physical Downlink Control Channel (PDCCH) is used for downlink scheduling. Physical Downlink Shared Channel (PDSCH) is used for downlink data. Similarly, Physical Uplink Control Channel (PUCCH) is used for carrying uplink control information. Physical Uplink Shared Channel (PUSCH) is used for uplink data. In addition, physical random-access channel (PRACH) is used for non-contention-based RACH.

One important use of broadcast information in any cellular systems is to set up channels for communication between the UE and the gNB. This is generally referred to as paging. Paging is a procedure the wireless network uses to find a UE, before the actual connection establishment. Paging is used to alert the UE of an incoming session (e.g., mobile terminated voice call, or downlink IP packets). In most cases, the paging process happens while UE is in radio resource control (RRC) idle mode or inactive mode. This means that UE has to monitor whether the networking is sending any paging message to it, and it has to spend some energy to run this "monitoring" process. During idle/inactive mode, a UE gets into and stays in sleeping mode defined in discontinuous reception (DRX) cycle. UE periodically wakes up and monitors PDCCH to check for the presence of a paging message. If the PDCCH indicates that a paging message is transmitted in a subframe, then the UE demodulates the paging channel to see if the paging message is directed to it.

In 5G system, paging early indication (PEI) notifies UEs of potentially relevant incoming paging such that these UEs are then able to skip paging occasions (POs) in which the UEs are (definitely) not being paged, thus saving power (decoding POs being more power hungry than decoding PEI). To this effect, UE subgrouping is introduced that allows waking up subgroups of UEs for potentially relevant paging. The RAN and UE may use a Paging Early Indication with Paging Subgrouping (PEIPS) to reduce the UE's power consumption in RRC_IDLE and RRC_INACTIVE over NR. The Paging Subgrouping can be based on either the UE's temporary ID or a paging subgroup allocated by an access and mobility function (AMF).

A UE may indicate its capability to support NR paging subgrouping during REGISTRATION procedure, during which the UE receives PEIPS assistance information from the network. The network may also provide the PEIPS assistance information to the UE by including the updated PEIPS assistance information IE in the CONFIGURATION UPDATE COMMAND message. The UE then monitors paging according to PEIPS assistance information to save power. When the UE is registered to both a 3GPP access and non-3GPP access, it is undefined how the UE should handle the PEIPS assistance information obtained over 3GPP access or non-3GPP access.

SUMMARY

A method of handling Paging Early Indication with Paging Subgrouping (PEIPS) assistance information when a UE is registered to the same or different PLMN/SNPN networks is proposed. The PEIPS assistance information includes PEIPS parameters such as a PEIPS subgroup ID that is used by the UE for monitoring paging (early indication) with PEIPS for power saving. If the UE registers to the same PLMN/SNPN network, then the UE handles the PEIPS parameters as one common parameters. If the UE registers to different PLMN/SNPN networks, then the UE handles the PEIPS parameters as two independent parameters.

In one embodiment, a UE maintains a first negotiated Paging Early Indication with Paging Subgrouping (PEIPS) assistance information, wherein the UE is registered to a first network via a first access and a second network via a second access. The UE monitors paging using the first negotiated PEIPS assistance information. The UE receives a CONFIGURATION UPDATE COMMAND message from the second access that carries a second updated PEIPS assistance information. The UE monitors paging using the first negotiated PEIPS assistance information when the first network and the second network are different. Otherwise, the UE monitors paging using the second updated PEIPS assistance information when the first network and the second network are the same network.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
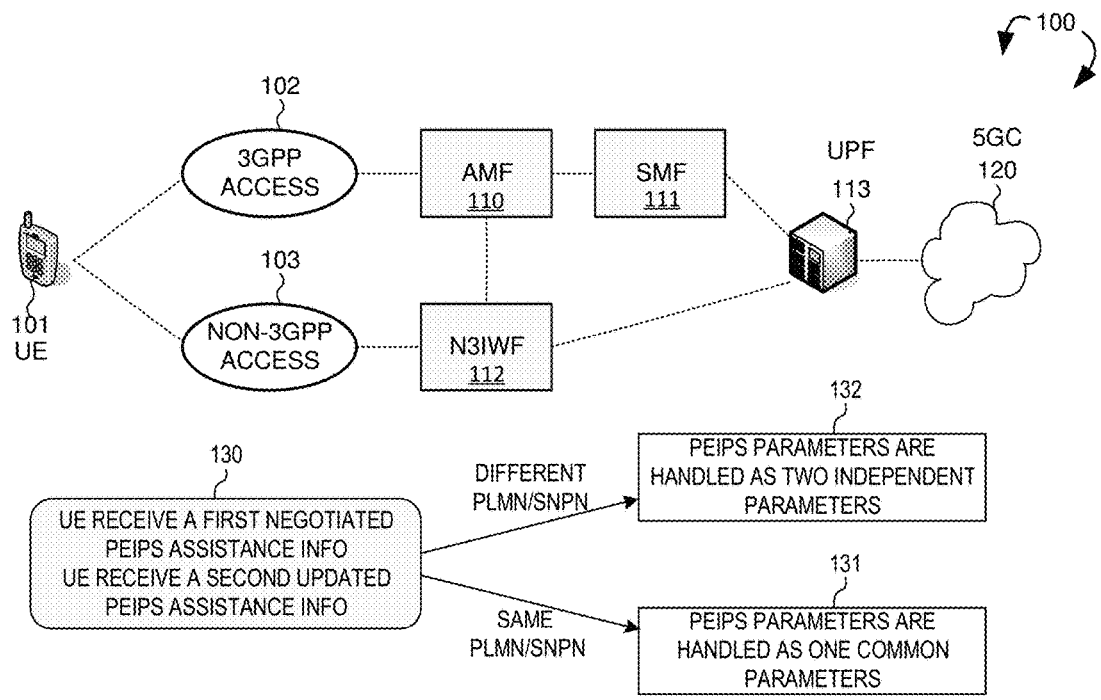
FIG. 1 illustrates an exemplary 5G network and a method of Paging Early Indication with Paging Subgrouping (PEIPS) assistance information handling when a User Equipment (UE) is registered to both 3GPP access and non-3GPP access in accordance with one novel aspect.

FIG. 1 illustrates an exemplary 5G network 100 and a method of Paging Early Indication with Paging Subgrouping (PEIPS) assistance information handling when a User Equipment (UE) is registered to both 3GPP access and non-3GPP access in accordance with one novel aspect. 5G new radio (NR) network 100 comprises a user equipment (UE) 101, a 3GPP access 102 (e.g., a 3GPP radio access network (RAN)), a non-3GPP access 103 (e.g., a non-3GPP RAN), an access and mobility management function (AMF) 110, a session management function (SMF) 111, a non-3GPP interworking function (N3IWF) 112, a user plane function (UPF) 113, and a 5G core (5GC) data network 120. The AMF 110 communicates with the base stations in the 3GPP access 102, the SMF 111, and the UPF 113 for access and mobility management of wireless access devices in the 5G network 100. The SMF 111 is primarily responsible for interacting with the decoupled data plane, creating, updating, and removing PDU sessions and managing session context with the UPF 113. The N3IWF 112 interfaces to 5G core network control plane functions, responsible for routing messages outside 5G RAN.

In Access Stratum (AS) layer, an RAN provides radio access for the UE 101 via a radio access technology (RAT). In Non-Access Stratum (NAS) layer, the AMF 110 and the SMF 111 communicate with RAN and 5GC for access and mobility management and PDU session management of wireless access devices in the 5G network 100. The 3GPP access 102 may include base stations (gNBs or eNBs) providing radio access for the UE 101 via various 3GPP RATs including 5G, 4G, and 3G/2G. The non-3GPP access 103 may include access points (APs) providing radio access for the UE 101 via non-3GPP RAT including WiFi. The UE 101 can obtain access to data network 120 through 3GPP access 102, AMF 110, SMF 111, and UPF 113. The UE 101 can obtain access to data network 120 through non-3GPP access 103, N3IWF 112, AMF 110, SMF 111, and UPF 113. The UE 101 may be equipped with a single radio frequency (RF) module or transceiver or multiple RF modules or transceivers for services via different RATs/CNs. In some examples, UE 101 may be a smart phone, a wearable device, an Internet of Things (IoT) device, a tablet, etc.

A PDU session defines the association between the UE and the data network that provides a PDU connectivity service Each PDU session is identified by a PDU session ID, and can be established over a 3GPP RAN, and/or over a non-3GPP RAN. 5G session management (5GSM) for PDU sessions over both 3GPP access and non-3GPP access are managed by AMF and SMF via NAS signaling.

In 5G system, a paging early indication (PEI) notifies UEs of potentially relevant incoming paging such that these UEs are then able to skip paging occasions (POs) in which the UEs are (definitely) not being paged, thus saving power (decoding POs being more power hungry than decoding PEI). To this effect, UE subgrouping is introduced that allows waking up subgroups of UEs for potentially relevant paging. The RAN and UE may use a Paging Early Indication with Paging Subgrouping (PEIPS) to reduce the UE's power consumption in RRC_IDLE and RRC_INACTIVE over NR. The Paging Subgrouping can be based on either the UE's temporary ID or a paging subgroup allocated by AMF.

A UE may indicate its capability to support NR paging subgrouping during REGISTRATION procedure, during which the UE receives PEIPS assistance information from the network. The network may also provide the PEIPS assistance information to the UE by including the updated PEIPS assistance information IE in the CONFIGURATION UPDATE COMMAND message. The UE then monitors paging (early indication) according to PEIPS assistance information to save power. When the UE is registered to both a 3GPP access and a non-3GPP access, it is undefined how the UE should handle the PEIPS assistance information obtained over 3GPP access or non-3GPP access.

In accordance with one novel aspect, a method of handling PEIPS assistance information when UE is registered to the same or different PLMN/SNPN over 3GPP/non-3GPP is proposed. UE 101 registers to one or more Public Land Mobile Network (PLMN) or Standalone Non-Public Network (SNPN) over 3GPP access and non-3GPP access. As depicted in 130, UE 101 may receive a Negotiated PEIPS assistance information (e.g., the first PEIPS assistance info), including a first Paging subgroup ID, in the REGISTRATION ACCEPT message over 3GPP. UE 101 then starts to use the first paging subgroup ID when monitoring paging (early indication) over 3GPP access. UE 101 may also receive an Updated PEIPS assistance information (e.g., the second PEIPS assistance info), including a second Paging subgroup ID, in the CONFIGURATION UPDATE COMMAND message over non-3GPP. If UE 101 registers to the same PLMN/SNPN over 3GPP and non-3GPP access, then UE 101 handles the PEIPS parameters as one common parameters (131). For example, UE 101 starts to use the second paging subgroup ID when monitoring paging (early indication), even though the second paging subgroup ID is received via non-3GPP access. On the other hand, if UE 101 registers to different PLMN/SNPN over 3GPP and non-3GPP, then UE 101 handles the PEIPS parameters as two independent parameters (132). For example, UE 101 continues to use the first paging subgroup ID when monitoring paging (early indication) and does not use the second paging subgroup ID because it is received via non-3GPP access.

Figure 2:
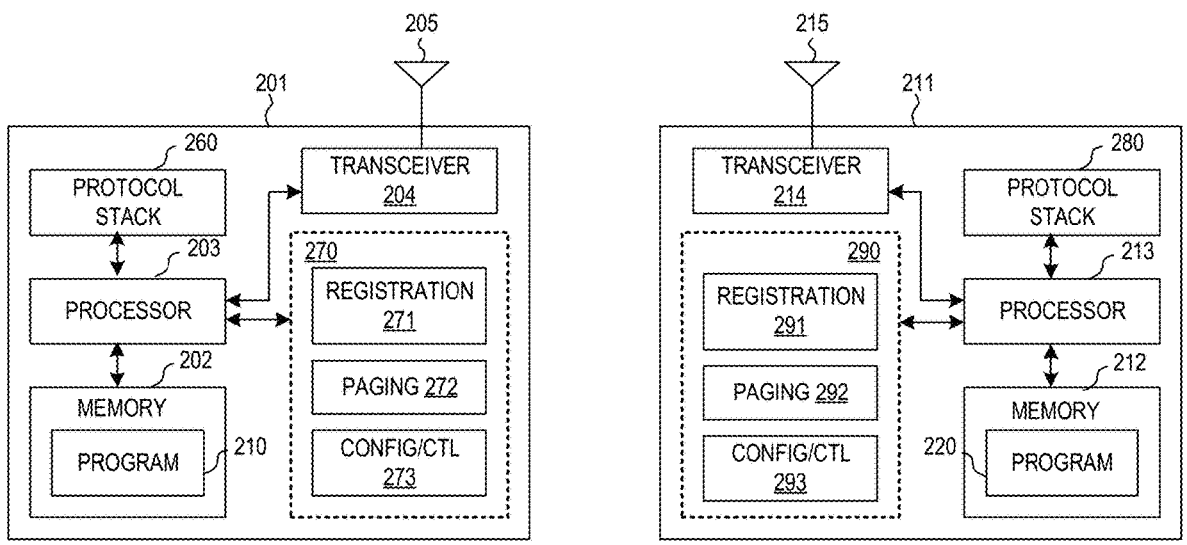
FIG. 2 illustrates simplified block diagrams of a user equipment (UE) and a network entity in accordance with embodiments of the current invention.

FIG. 2 illustrates simplified block diagrams of wireless devices, e.g., a UE 201 and a network entity 211 in accordance with embodiments of the current invention. Network entity 211 may be a base station and/or an AMF/SMF. Network entity 211 has an antenna 215, which transmits and receives radio signals. A radio frequency RF transceiver module 214, coupled with the antenna, receives RF signals from antenna 215, converts them to baseband signals and sends them to processor 213. RF transceiver 214 also converts received baseband signals from processor 213, converts them to RF signals, and sends out to antenna 215. Processor 213 processes the received baseband signals and invokes different functional modules to perform features in base station 211. Memory 212 stores program instructions and data 220 to control the operations of base station 211. In the example of FIG. 2, network entity 211 also includes protocol stack 280 and a set of control function modules and circuits 290. Protocol stacks 280 includes Non-Access-Stratum (NAS) layer to communicate with an AMF/SMF/MME entity connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. In one example, control function modules and circuits 290 includes a registration circuit 291 that handles registration procedures, a paging handling circuit 292 that performs paging, and a configuration and control circuit 293 that provides different parameters to configure and control UE of related functionalities including registration and paging. The network entity 211 can be one 5GS network component or more than one 5GS network components (e.g., access network+AMF+N3IWF+SMF, etc.)

Similarly, UE 201 has memory 202, a processor 203, and radio frequency (RF) transceiver module 204. RF transceiver 204 is coupled with antenna 205, receives RF signals from antenna 205, converts them to baseband signals, and sends them to processor 203. RF transceiver 204 also converts received baseband signals from processor 203, converts them to RF signals, and sends out to antenna 205. Processor 203 processes the received baseband signals and invokes different functional modules and circuits to perform features in UE 201. Memory 202 stores data and program instructions 210 to be executed by the processor to control the operations of UE 201. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines. A processor in associated with software may be used to implement and configure features of UE 201.

UE 201 also includes protocol stacks 260 and a set of control function modules and circuits 270. Protocol stacks 260 includes NAS layer to communicate with an AMF/SMF/MME entity connecting to the core network, RRC layer for high layer configuration and control, PDCP/RLC layer, MAC layer, and PHY layer. Control function modules and circuits 270 may be implemented and configured by software, firmware, hardware, and/or combination thereof. The control function modules and circuits, when executed by the processors via program instructions contained in the memory, interwork with each other to allow UE 201 to perform embodiments and functional tasks and features in the network. In one example, control function modules and circuits 270 includes a registration handling circuit 271 that performs registration procedure with the network, a paging handling circuit 272 that monitors paging, and a config and control circuit 273 that handles configuration and control parameters including PEIPS assistance information for registration and paging.

The generic PEIPS configuration and update procedure is as follows. If the UE indicates support of NR paging subgrouping and the network supports and accepts the use of the PEIPS assistance information for the UE, the network provides to the UE the Negotiated PEIPS assistance information, including the Paging subgroup ID, in the REGISTRATION ACCEPT message or the CONFIGURATION UPDATE COMMAND message. The Paging subgroup ID is used to determine the NR paging subgroup for paging the UE using PEEI. The network shall store the Paging subgroup ID in the 5GMM context of the UE. The UE shall use PEIPS assistance information only if the UE received the Negotiated PEIPS assistance information IE during the last registration procedure. If the UE did not receive the Negotiated PEIPS assistance information IE during the last registration procedure, the UE shall delete any existing PEIPS assistance information received from the network. If the UE supports the use of the PEIPS assistance information and the network supports and accepts the use of the PEIPS assistance information, the network may provide the PEIPS assistance information to the UE by including the Updated PEIPS assistance information IE in the CONFIGURATION UPDATE COMMAND message.

Figure 3:
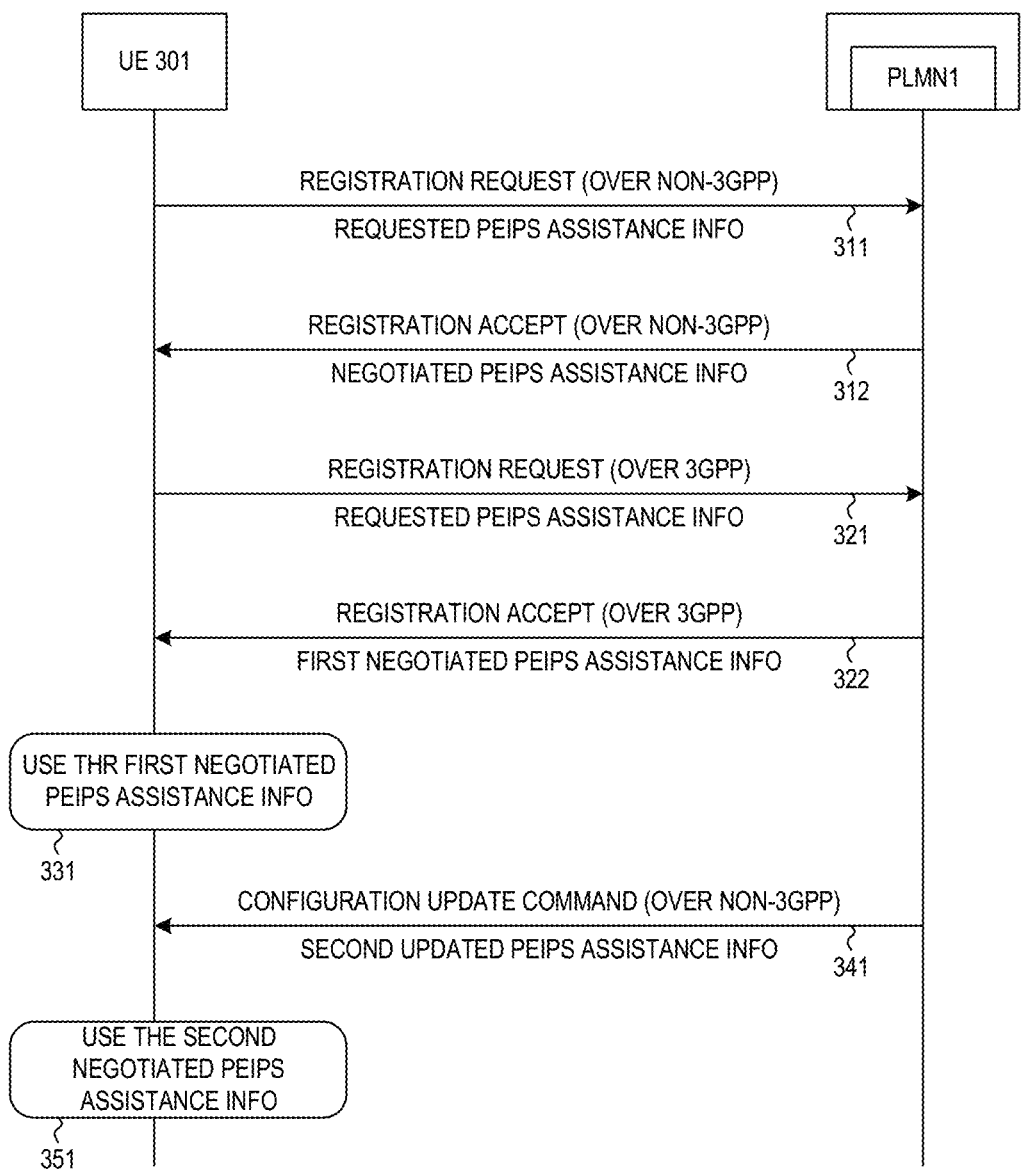
FIG. 3 illustrates one embodiment of PEIPS assistance information handling when a UE is registered to the same network over 3GPP access and non-3GPP access in accordance with one novel aspect.
Figure 3:
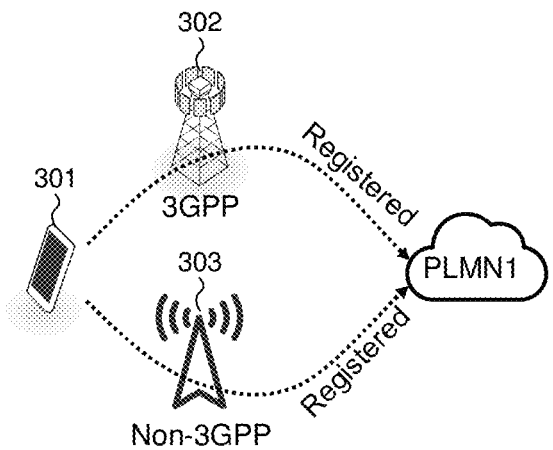

FIG. 3 illustrates one embodiment of PEIPS assistance information handling when a UE is registered to the same network over 3GPP access and non-3GPP access in accordance with one novel aspect. In step 311, UE 301 registers to PLMN1 by sending a REGISTRATION REQUEST message over non-3GPP access 303, the request message carries UE-Requested PEIPS assistance information. In step 312, UE 301 receives a REGISTRATION ACCEPT message over non-3GPP access, the accept message carries NW-Negotiated PEIPS assistance information, e.g., a negotiated PEIPS assistance information. In step 321, UE 301 registers to the same PLMN1 by sending a REGISTRATION REQUEST message over 3GPP access 302, the request message carries UE-Requested PEIPS assistance information. In step 322, UE 301 receives a REGISTRATION ACCEPT message over 3GPP access, the accept message carries NW-Negotiated PEIPS assistance information, e.g., a first negotiated PEIPS assistance information. Note that the first negotiated PEIPS assistance information can be provided by the network to the UE also over non-3GPP access. In step 331, UE 301 starts to use the first negotiated PEIPS assistance information, e.g., a first paging subgroup ID, to monitor paging (early indication) in 3GPP access.

In step 341, UE 301 receives a CONFIGURATION UPDATE COMMAND message from PLMN1 over non-3GPP access 303, carrying a NW-Updated PEIPS assistance information, e.g., a second updated PEIPS assistance information. UE 301 then determines whether the UE is registered to the same or different PLMN/SNPN over 3GPP access and non-3GPP access. In the example of FIG. 3, UE 301 is registered to the same PLMN1 over 3GPP access 302 and non-3GPP access 303. Therefore, UE 301 handles the PEIPS parameters for both 3GPP access and non-3GPP access as a common set of parameters. In another word, UE 301 handles and uses a common PEIPS assistance information, regardless of UE 301 receives the PEIPS assistance information from 3GPP access or non-3GPP access. As a result, in step 351, UE 301 stores the second updated PEIPS assistance information, and uses the second updated PEIPS assistance information, e.g., a second paging subgroup ID, to monitor paging (early indication) in 3GPP access.

Figure 4:
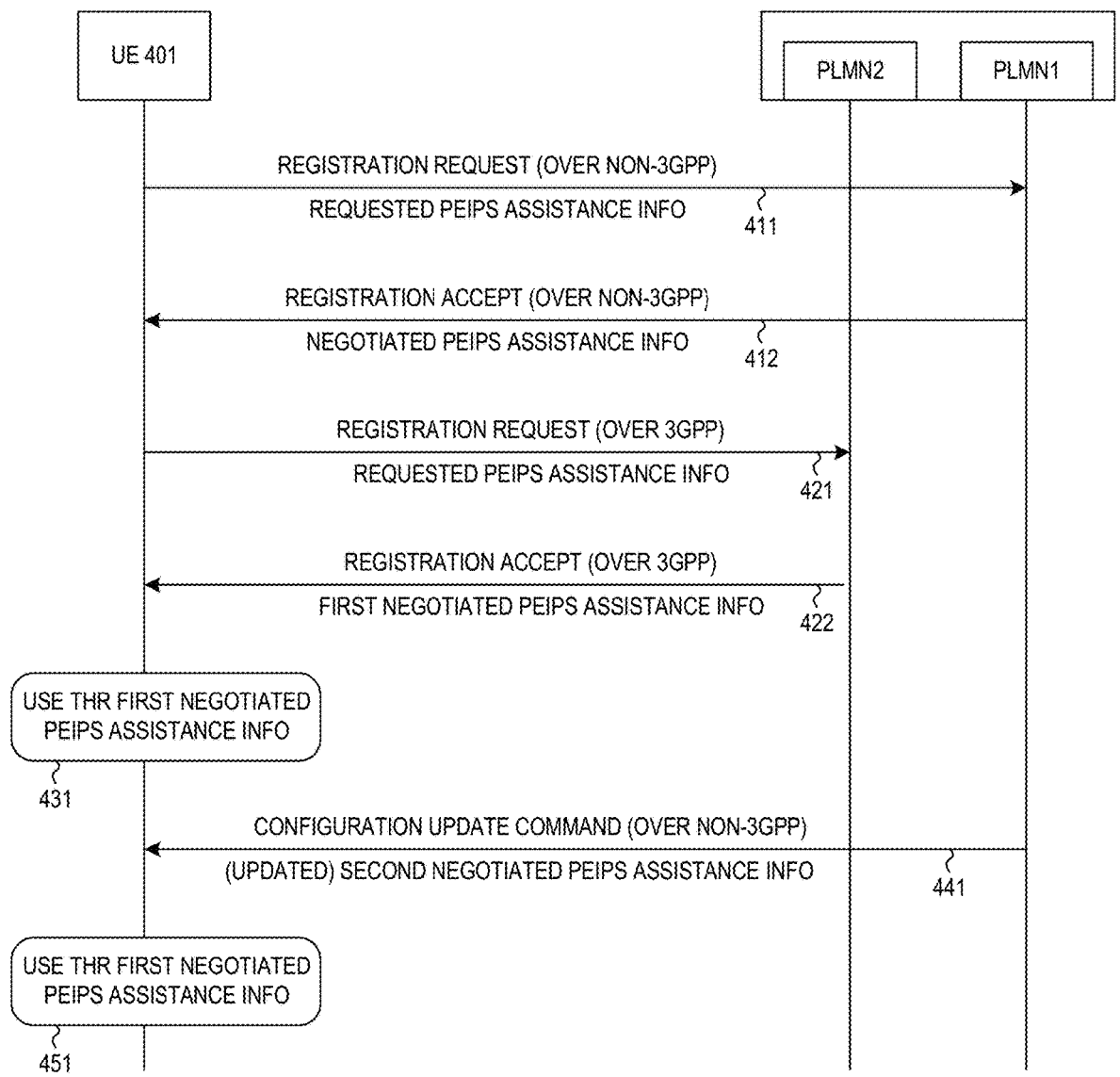
FIG. 4 illustrates one embodiment of PEIPS assistance information handling when a UE is registered to different networks over 3GPP access and non-3GPP access in accordance with one novel aspect.
Figure 4:
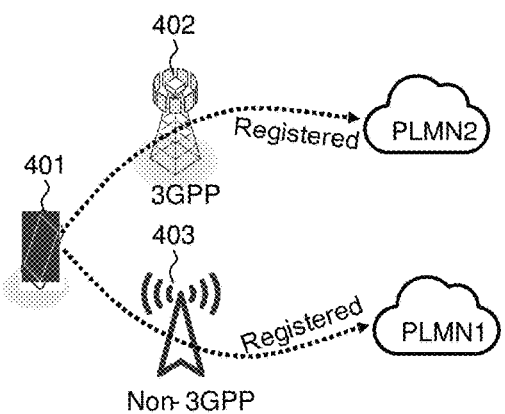

FIG. 4 illustrates one embodiment of PEIPS assistance information handling when a UE is registered to different networks over 3GPP access and non-3GPP access in accordance with one novel aspect. In step 411, UE 401 registers to PLMN1 by sending a REGISTRATION REQUEST message over non-3GPP access 403, the request message carries UE-Requested PEIPS assistance information. In step 412, UE 401 receives a REGISTRATION ACCEPT message from PLMN1 over 3GPP access, the accept message carries NW-Negotiated PEIPS assistance information. In step 421, UE 401 registers to another PLMN2 by sending a REGIS- TRATION REQUEST message over 3GPP access 402, the request message carries UE-Requested PEIPS assistance information. In step 422, UE 401 receives a REGISTRATION ACCEPT message from PLMN2 over 3GPP access, the accept message carries NW-Negotiated PEIPS assistance information, e.g., a first negotiated PEIPS assistance information. Note that the first negotiated PEIPS assistance information can also be provided by the PLMN1 to the UE over non-3GPP access. In step 431, UE 401 starts to use the first negotiated PEIPS assistance information, e.g., a first paging subgroup ID, to monitor paging (early indication) in 3GPP access.

In step 441, UE 401 receives a CONFIGURATION UPDATE COMMAND message from PLMN1 over non-3GPP access 403, carrying a NW-Updated PEIPS assistance information, e.g., a second updated PEIPS assistance information. UE 401 then determines whether the UE is registered to the same or different PLMN/SNPN over 3GPP access and non-3GPP access. In the example of FIG. 4, UE 401 is registered to PLMN1 over non-3GPP access 403 and is registered to PLMN2 over 3GPP access 402. Therefore, UE 401 handles the PEIPS parameters for 3GPP access and non-3GPP access as two independent sets of parameters. In another word, UE 401 handles and uses a two independent PEIPS assistance information, depending on whether UE 401 receives the PEIPS assistance information from 3GPP access or from non-3GPP access. As a result, in step 451, UE 401 stores the second updated PEIPS assistance information (since it is received from the non-3GPP access), and uses the first negotiated PEIPS assistance information, e.g., the first paging subgroup ID, to monitor paging (early indication) in 3GPP access.

Figure 5:
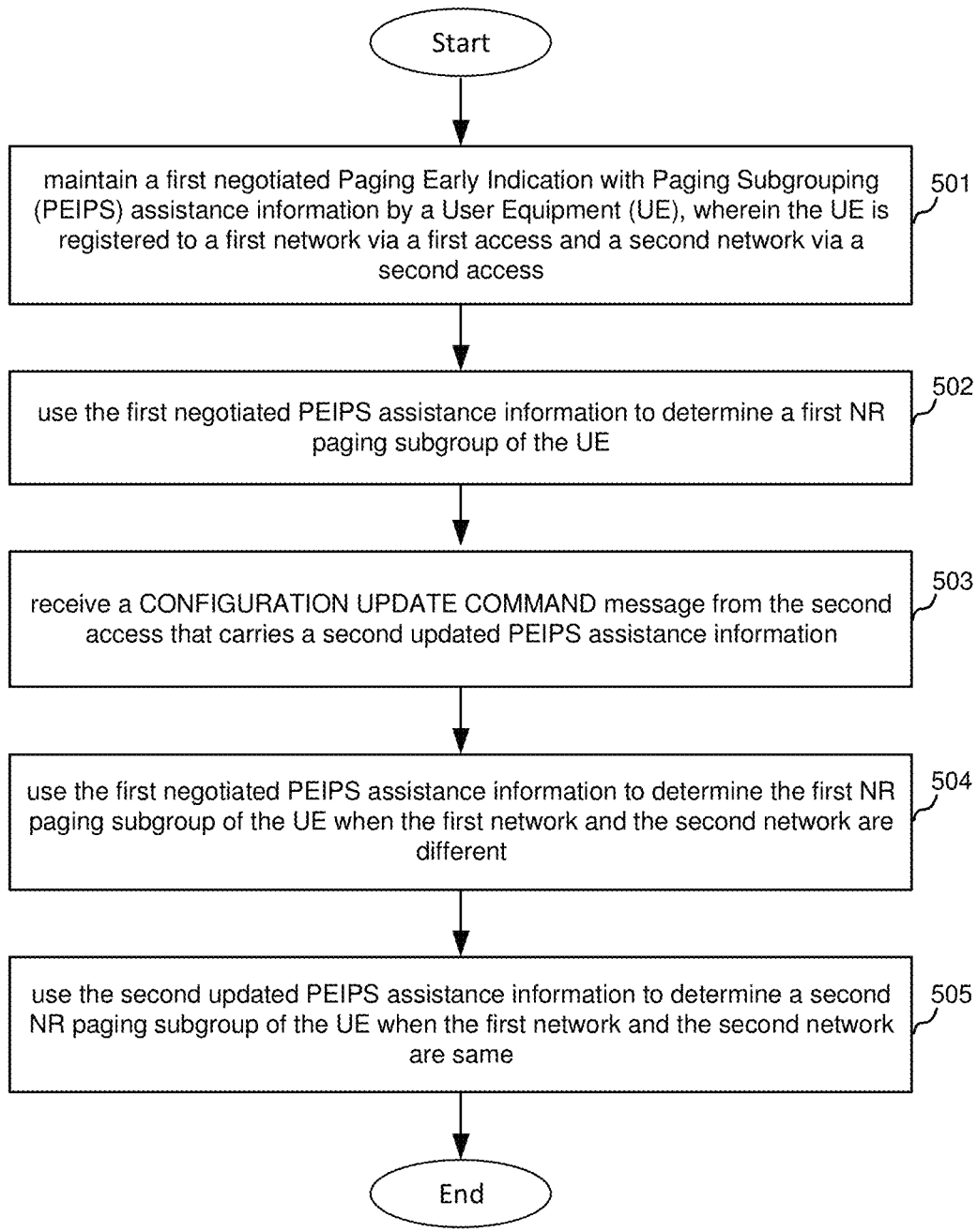
FIG. 5 is a flow chart of a method of handling PEIPS assistance information in accordance with one novel aspect of the present invention.

FIG. 5 is a flow chart of a method of handling PEIPS assistance information in accordance with one novel aspect of the present invention. In step 501, a UE maintains a first negotiated Paging Early Indication with Paging Subgrouping (PEIPS) assistance information, wherein the UE is registered to a first network via a first access and a second network via a second access. In step 502, the UE uses the first negotiated PEIPS assistance information to determine a first NR paging subgroup of the UE. In step 503, the UE receives a CONFIGURATION UPDATE COMMAND message from the second access that carries a second updated PEIPS assistance information. In step 504, the UE uses the first negotiated PEIPS assistance information to determine the first NR paging subgroup of the UE when the first network and the second network are different. Otherwise, in step 505, the UE uses the second updated PEIPS assistance information to determine a second NR paging subgroup of the UE when the first network and the second network are same.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   maintaining a first negotiated Paging Early Indication with Paging Subgrouping (PEIPS) assistance information by a User Equipment (UE), wherein the UE is registered to a first network via a first access and registered to a second network via a second access;
   using the first negotiated PEIPS assistance information to determine a first New Radio (NR) paging subgroup of the UE;
   receiving a CONFIGURATION UPDATE COMMAND message from the second access that carries a second updated PEIPS assistance information; and
   using the first negotiated PEIPS assistance information to determine the first NR paging subgroup of the UE when the first network and the second network are different networks, otherwise, using the second updated PEIPS assistance information to determine a second NR paging subgroup of the UE when the first network and the second network are a same network.

2. The method of claim 1, wherein the first access is 3GPP access, and the second access is non-3GPP access.

3. The method of claim 1, wherein the UE registers to the first network via first access or to the second network via second access by sending a REGISTRATION REQUEST message that carries a requested PEIPS assistance information.

4. The method of claim 3, wherein the UE receives a REGISTRATION ACCEPT message that carries the first negotiated PEIPS assistance information.

5. The method of claim 1, wherein the first negotiated PEIPS assistance information comprises a paging subgroup ID to be used by the UE for monitoring paging early indication.

6. The method of claim 1, wherein the first network and the second network belong to different public land mobile networks (PLMNs) or different standalone non-public networks (SNPNs), or the first network is a PLMN and the second network is an SNPN, or the first network is an SNPN and the second network is a PLMN.

7. The method of claim 6, wherein PEIPS parameters sent over the first access and the second access are managed as two independent parameters.

8. The method of claim 1, wherein the first network and the second network belong to same public land mobile network (PLMN) or belong to the same standalone non-public network (SNPN).

9. The method of claim 8, wherein PEIPS parameters sent over the first access and the second access are managed as one common parameters.

10. A User Equipment (UE), comprising:
    a control circuit that maintains a first negotiated Paging Early Indication with Paging Subgrouping (PEIPS) assistance information, wherein the UE is registered to a first network via a first access and registered to a second network via a second access;
    a paging handling circuit that uses the first negotiated PEIPS assistance information to determine a first New Radio (NR) paging subgroup of the UE;
    a receiver that receives a CONFIGURATION UPDATE COMMAND message from the second access that carries a second updated PEIPS assistance information; and
    the paging handling circuit that uses the first negotiated PEIPS assistance information to determine the first NR paging subgroup of the UE when the first network and the second network are different networks, otherwise, the paging handling circuit uses the second updated PEIPS assistance information to determine a second NR paging subgroup of the UE when the first network and the second network are same.

11. The UE of claim 10, wherein the first access is 3GPP access, and the second access is non-3GPP access.

12. The UE of claim 10, wherein the UE registers to the first network via first access or to the second network via second access by sending a REGISTRATION REQUEST message that carries a requested PEIPS assistance information.

13. The UE of claim 12, wherein the UE receives a REGISTRATION ACCEPT message that carries the first negotiated PEIPS assistance information.

14. The UE of claim 10, wherein the first negotiated PEIPS assistance information comprises a paging subgroup ID to be used by the UE for monitoring paging early indication.

15. The UE of claim 10, wherein the first network and the second network belong to different public land mobile networks (PLMNs) or different standalone non-public networks (SNPNs), or the first network is a PLMN and the second network is an SNPN, or the first network is an SNPN and the second network is a PLMN.

16. The UE of claim 15, wherein PEIPS parameters sent over the first access and the second access are managed as two independent parameters.

17. The UE of claim 10, wherein the first network and the second network belong to same public land mobile network (PLMN) or same standalone non-public network (SNPN).

18. The UE of claim 17, wherein PEIPS parameters sent over the first access and the second access are managed as one common parameters.

\* \* \* \* \*